United States Patent [19]  [11] 3,725,479
Cannon  [45] Apr. 3, 1973

[54] BIS(4-AMINO-OR 4-SUBSTITUTED AMINO-3,5-DINITROPHENYL) DISULFIDE

[75] Inventor: William N. Cannon, Greenwood, Ind.

[73] Assignee: Eli Lilly and Company, Indianapolis, Ind.

[22] Filed: Apr. 20, 1970

[21] Appl. No.: 30,228

[52] U.S. Cl. .................. 260/576, 260/578, 260/608
[51] Int. Cl. .............................................. C07c 87/62
[58] Field of Search ...................... 260/576, 578, 571

[56] References Cited

UNITED STATES PATENTS 3,367,949  2/1968  Soper ........................................ 260/71

FOREIGN PATENTS OR APPLICATIONS 462,497  1/1950  Canada ............................... 260/578

OTHER PUBLICATIONS

Theilheimer, Synthetische Methoden der Organischen Chemie, Vol. 4, page 185 (1950) [Interscience, Pub., Inc.: New York].

Theilheimer, Synthetic Methods of Organic Chemistry, Vol. 8, page 252 (1954) [Interscience, Pub., Inc.: New York].

Wagner & Zook, Synthetic Organic Chemistry, John Wiley & Sons, Inc.: New York, 1953, page 665–670.

*Primary Examiner*—Lewis Gotts
*Assistant Examiner*—C. F. Warren
*Attorney*—Everet F. Smith and Walter E. Buting

[57] ABSTRACT

Bis(hydroxy, amino, or substituted lower alkyl, alkenyl, or alkynylamino-3,5-dinitrophenyl)disulfide prepared by treating 4-chloro-3,5-dinitrophenyl thiocyanate with an alkali metal hydroxide, carbonate, acid carbonate, or nitrite, ammonium hydroxide, ammonia, or a primary or secondary lower aliphatic amine; useful as intermediates for the synthesis of herbicides.

6 Claims, No Drawings

BIS(4-AMINO-OR 4-SUBSTITUTED AMINO-3,5-DINITROPHENYL) DISULFIDE

BACKGROUND OF THE INVENTION

U.S. Pat. No. 3,367,949 describes the preparation of herbicidally active sulfanilamides from the corresponding benzenesulfonyl chloride.

Heretofore, the desired 4-substituted-3,5-dinitrobenzenesulfonyl chloride has been formed from the corresponding potassium sulfonate. The potassium sulfonate derivative is obtained by a multi-step synthesis which employs 1-chloro-2-nitrobenzene as the starting material; proceeds through a nitration-sulfonation step utilizing fuming mixed nitric-sulfuric acid, and results in the isolation of the potassium salt of 4-chloro-3,5-dinitrobenzene sulfonic acid, which is then converted to the wanted potassium-4-substituted-3,5-dinitrobenzene sulfonate.

The use of fuming mixed nitric-sulfuric acid imposes a burden on the process as the disposal of the spent acid is costly and difficult because of its dangerous nature. Also, the requirement that the potassium salt of 4-1-chloro-3,5-dinitrobenzene sulfonic acid must be of before proceeding introduces expensive materials handling costs, as well as opportunities for product losses. Therefore, a more simplified and economic process for producing 4-substituted-3,5-dinitrobenzenesulfonyl chloride is highly desirable.

SUMMARY

This invention provides novel bis(4-substituted-3,5-dinitrophenyl) disulfide compounds, useful as herbicide intermediates. Bis(4-hydroxy-3,5-dinitrophenyl) disulfide is obtained by reacting 4-chloro-3,5-dinitrophenyl thiocyanate with an alkali metal hydroxide, carbonate, acid carbonate, or nitrite in a suitable solvent, such as an ethanol-water mixture, at refluxing temperature. Bis[4-amino(or substituted amino)-3,5-dinitrophenyl] disulfide is prepared by treating 4-chloro-3,5-dinitrophenyl thiocyanate with ammonia, ammonium hydroxide, or a primary or secondary aliphatic amine in a suitable solvent, such as benzene, at refluxing temperature. Sulfanilamide herbicides are obtained from the novel compounds of this invention.

DESCRIPTION OF THE PREFERRED EMBODIMENTS

This invention relates to novel bis(4-substituted-3,5-dinitrophenyl) disulfides, intermediate compounds employed in the synthesis of herbicidally active sulfanilamides, and to a method for their preparation.

It is an object of this invention to provide herbicide intermediates which are readily and economically convertible to herbicidally active novel substituted sulfanilamides described in more detail in U.S. Pat. No. 3,367,949. It is a further object of this invention to provide a process by which these intermediates are conveniently prepared.

It has now been discovered that if a substituted phenyl thiocyanate such as 4-chloro-3,5-dinitrophenyl thiocyanate is reacted with a suitable amine, ammonia, ammonium hydroxide, or an alkali metal base in an appropriate solvent, there is obtained a bis(4-substituted-3,5-dinitrophenyl) disulfide, a herbicide intermediate of valuable properties. The employment of ammonia, ammonium hydroxide, or a suitable primary or secondary aliphatic amine in effecting the condensation of two moles of 4-chloro-3,5-dinitrophenyl thiocyanate into one mole of bis(4-substituted-3,5-dinitrophenyl) disulfide results in the substitution of an unsubstituted, monosubstituted, or disubstituted amino group for the chlorine in the 4-position. The use of an alkali metal base in accomplishing the aforementioned condensation results in the substitution of a hydroxyl group for the chlorine in the 4-position. The herbicide intermediates of this invention are highly reactive and are readily converted to herbicides by relatively simple procedures.

The unexpected formation of the bis(4-substituted-3,5-dinitrophenyl) disulfides from the corresponding 4-chloro-3,5-dinitrophenyl thiocyanates provides useful compounds which can be employed in the multi-step synthesis of the desired substituted sulfanilamide herbicide obviating the requirement inherent in the prior art processes of isolating potassium-4-amino(or substituted amino)-3,5-dinitrobenzene sulfonate on the way to 4-amino(or substituted amino)-3,5-dinitrobenzenesulfonyl chloride, which in turn is converted to the corresponding herbicidally active sulfanilamide, unsubstituted, monosubstituted, or disubstituted on the sulfonamide nitrogen, respectively.

Another advantage of the novel process of this invention lies in the nearly quantitative yields of the bis disulfide derivatives which are achieved, adding to the economics of preparing herbicidally active sulfonamides from these compounds.

The novel herbicide intermediate compounds of this invention are bis[4-hydroxy(or unsubstituted, monosubstituted, or disubstituted amino)-3,5-dinitrophenyl] disulfides having the structure:

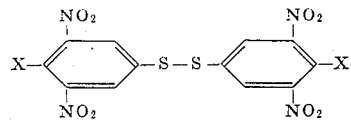

wherein X is hydroxyl or:

and $R_1$ and $R_2$ can be the same or different and are members of the group consisting of hydrogen, lower alkyl, lower alkenyl, and lower alkynyl.

The term "lower alkyl" as used herein means methyl, ethyl, n-propyl, isopropyl, n-butyl, sec-butyl, and t-butyl. The term "lower alkenyl" as used herein means vinyl, propenyl, allyl, 1-butenyl, 2-butenyl, 3-butenyl, 1-butene-2-yl, 2-butene-3-yl, and 1-butene-3-yl. The term "lower alkynyl" as used herein means ethynyl, 1-propynyl, 2-propynyl, 1-butynyl, 2-butynyl, 3-butynyl, and 1-butyn-3-yl.

The useful herbicide intermediates of the present invention can be readily prepared in a single-step synthesis by heating together in a suitable non-reactive organic solvent such as, for example, benzene, methyl ethyl ketone, N,N-dimethylformamide, or a 3:1 to 1:3 ethanol-water solution the known compound 4-chloro-3,5-dinitrophenyl thiocyanate and about a 25 percent molar excess (2 moles of the base, or basic salt, are required for each mole of thiocyanate) of a lower alkyl, lower alkenyl, or lower alkynyl primary or secondary amine, ammonia or ammonium hydroxide, or an acid carbonate, carbonate, hydroxide, or nitrite or lithium, potassium, sodium or cesium. The reaction is generally conducted in a five- to twentyfold, volume/weight, excess of solvent at atmospheric pressure for from 3 to 24 hours at a temperature of from about 50° C to the refluxing temperature of the reaction mixture, preferably at the refluxing temperature for from 3 to 6 hours.

| Reactant | Product |
|---|---|
| NH$_4$OH | Bis(4-amino-3,5-dinitrophenyl) disulfide |
| NaHCO$_3$ | Bis(4-hydroxy-3,5-dinitrophenyl) disulfide |
| HN(n-C$_3$H$_7$)$_2$ | Bis[4-di(n-propyl)amino-3,5-dinitrophenyl] disulfide |
| n-C$_4$H$_9$NHC$_2$H$_5$ | Bis[4-(butyl)ethylamino-3,5-dinitrophenyl] disulfide |
| HN(CH$_2$CH=CH$_2$)$_2$ | Bis(4-diallylamino-3,5-dinitrophenyl) disulfide |
| HN(CH$_2$C≡CH)$_2$ | Bis[4-di(2-propynyl)amino-3,5-dinitrophenyl] disulfide |

An advantage of the herbicide intermediates of the present invention is the simplicity of the procedure by which they can be converted to herbicidally active sulfanilamides. For instance, bis(4-hydroxy-3,5-dinitrophenyl) disulfide can be treated with phosphorous oxychloride to form bis(4-chloro-3,5-dinitrophenyl) disulfide. The bis (4-chloro-3,5-dinitrophenyl) disulfide can be converted to the corresponding bis(4-substituted amino-3,5-dinitrophenyl) disulfide wherein the 4-substituted amino substituent can be a pyrrolidino, piperidino, or morpholino ring as well as a primary or secondary lower alkyl, alkenyl, or alkynyl amino moiety.

The bis(4-substituted amino -3,5-dinitrophenyl) disulfide can be converted to the 4-substituted amino-3,5-dinitrophenyl sulfonyl chloride by chlorinating the disulfide derivative. The reaction generally is carried out by slurrying the bis(4-substituted amino-3,5-dinitrophenyl) disulfide in from five- to twentyfold volumes of water and saturating the aqueous mixture with chlorine, raising the temperature to reflux and continuing the addition of chlorine until the reaction is complete. The excess chlorine is removed by vacuum and the reaction products extracted into toluene. The desired sulfanilamide herbicide is produced by reacting the corresponding sulfonyl chloride with ammonium hydroxide, or a primary amine or a secondary amine, to yield the corresponding benzenesulfonamide, unsubstituted, monosubstituted, or disubstituted on the sulfonamide nitrogen atom, respectively. U.S. Pat. No. 3,367,949 describes in more detail the procedure for converting benzenesulfonyl chlorides to herbicidally active sulfanilamides.

The various herbicidally active sulfonamides thus prepared are useful for eliminating weed grasses and certain broadleaf weeds selectively from crop plants such as rice, cotton, soybeans, and corn and their close relatives in the plant kingdom.

The method of preparing the herbicide intermediates of this invention is further illustrated by the following examples.

EXAMPLE 1

Bis[4-di(n-propyl)amino-3,5-dinitrophenyl] disulfide

About 10.4 g. (0.04 mole) of 4-chloro-3,5-dinitrophenyl thiocyanate were dissolved in 150 ml. of benzene and 10.1 g. (0.1 mole) of di(n-propyl)amine were added with stirring. The mixture warmed up, turned deep red colored, and a precipitate formed and began to separate. The reaction mixture was heated to reflux for 3 hours with stirring. The reaction mixture was cooled to room temperature and washed 3 times with a 1x volume of water, after which the benzene solution was dried over anhydrous magnesium sulfate, filtered, and the filtrate evaporated to dryness. The residue was recrystallized from 95 percent ethanol to yield about 11.2 g. of reddish-orange crystals of bis[4-di(n-propyl)amino-3,5-dinitrophenyl] disulfide having a melting point of 78°–80° C.

Analysis: $C_{24}H_{32}N_6O_8S_2$; Mol. Wt.: 597; Calc.: C, 48.31; H, 5.40; N, 14.09; S, 10.75; Found: C, 48.46; H, 5.53; N, 13.88; S, 10.57. Mass spectral data confirmed the disulfide structure and IR examination showed the absence of the —SCN function.

EXAMPLE 2

Bis[4-(n-butyl)ethylamino-3,5-dinitrophenyl] disulfide

About 10.4 g. (0.04 mole) of 4-chloro-3,5-dinitrophenyl thiocyanate were dissolved in about 150 ml. of benzene and about 10.1 g. of n-butylethylamine were added with stirring. The reaction and isolation of the product were carried out as detailed in Example 1. About 11 g. of reddish-orange crystals of bis[4-(n-butyl)ethylamino-3,5-dinitrophenyl] disulfide were obtained with a melting point of 93°–94° C.

Analysis: $C_{24}H_{32}N_6O_8S_2$; Mol. Wt.: 597; Calc.: C, 48.31; H, 5.40; N, 14.09; S, 10.75; Found: C, 48.23; H, 5.31; N, 14.08; S, 10.85; Mass spectral and IR examination confirmed the disulfide structure and the absence of the —SCN function, respectively.

EXAMPLE 3

Bis(4-hydroxy-3,5-dinitrophenyl) disulfide

About 10.4 g. (0.04 mole) of 4-chloro-3,5-dinitrophenyl thiocyanate were dissolved in about 150 ml. of a 1:1 mixture of ethanol and water and about 4.0 g. (0.10 mole) of sodium hydroxide added with stirring. The reaction was carried out as detailed in Example 1. The formation of bis(4-hydroxy-3,5-dinitrophenyl) disulfide was confirmed by analysis showing the absence of a —SCN band in the IR spectra. The compound has a mol. wt. of 458.

What is claimed is:

1. A compound having the formula:

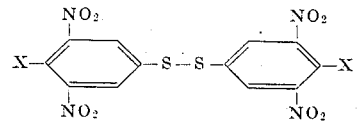

wherein X is:

and $R_1$ and $R_2$ can be the same or different and are selected from the group consisting of hydrogen, lower alkyl, lower alkenyl, and lower alkynyl.

2. A compound according to claim 1 wherein the compound is bis(4-amino-3,5-dinitrophenyl) disulfide.

3. A compound according to claim 1 wherein the compound is bis[4-di(n-propyl)amino-3,5-dinitrophenyl] disulfide.

4. A compound according to claim 1 wherein the compound is bis[4-(n-butyl)ethylamino-3,5-dinitrophenyl] disulfide.

5. A compound according to claim 1 wherein the compound is bis(4-diallylamino-3,5-dinitrophenyl) disulfide.

6. A compound according to claim 1 wherein the compound is bis[4-di(2-propynylamino)-3,5-dinitrophenyl] disulfide.

* * * * *

UNITED STATES PATENT OFFICE
CERTIFICATE OF CORRECTION

Patent No. 3,725,479          Dated   April 2, 1974

Inventor(s) William N. Cannon

It is certified that error appears in the above-identified patent and that said Letters Patent are hereby corrected as shown below:

Column 1, line 23, the last word in the line, of, is deleted and the word isolated is substituted therefore.

Signed and sealed this 6th day of August 1974.

(SEAL)
Attest:

McCOY M. GIBSON, JR.             C. MARSHALL DANN
Attesting Officer                Commissioner of Patents